(12) United States Patent
Riek et al.

(10) Patent No.: US 11,597,076 B2
(45) Date of Patent: Mar. 7, 2023

(54) HARDWARE MODULE FOR A ROBOTIC SYSTEM, AND MECHANICAL COUPLING

(71) Applicant: Festo SE & Co. KG, Esslingen (DE)

(72) Inventors: Alfons Riek, Weilheim (DE); Kurt Stoll, Prêles (CH); Hans Klingel, Stuttgart (DE); Marcel Aeschlimann, Ligerz (CH); Samuel Malzach, Evilard (CH); Martin Sigrist, Bern (CH); Christian Schmid, Feusisberg (CH); Christoph Berger, Oberburg (CH); Leif Pudewills, Esslingen (DE); Kilian Iannucci, Bern (CH)

(73) Assignee: Festo SE & Co. KG, Esslingen (DE)

( * ) Notice: Subject to any disclaimer, the term of this patent is extended or adjusted under 35 U.S.C. 154(b) by 333 days.

(21) Appl. No.: 16/759,590

(22) PCT Filed: Oct. 25, 2018

(86) PCT No.: PCT/EP2018/079325
§ 371 (c)(1),
(2) Date: Apr. 27, 2020

(87) PCT Pub. No.: WO2019/081662
PCT Pub. Date: May 2, 2019

(65) Prior Publication Data
US 2020/0269417 A1      Aug. 27, 2020

(30) Foreign Application Priority Data
Oct. 27, 2017   (EP) .................................. 17198992

(51) Int. Cl.
*B25J 9/08* (2006.01)
*B25J 9/12* (2006.01)
(Continued)

(52) U.S. Cl.
CPC . *B25J 9/08* (2013.01); *B25J 9/12* (2013.01); *B25J 9/161* (2013.01); *B25J 13/088* (2013.01);
(Continued)

(58) Field of Classification Search
CPC ................ B25J 19/0029; B25J 19/0025; B25J 19/0033; B25J 19/0041
See application file for complete search history.

(56) References Cited

U.S. PATENT DOCUMENTS 5,155,423 A      10/1992   Karlen et al.
5,283,393 A *    2/1994    Guginsky ................ H02G 9/06
                                                        174/109
(Continued)

FOREIGN PATENT DOCUMENTS

EP     1287868 A2    3/2003
GB     2533314 A     6/2016

OTHER PUBLICATIONS

Victor Zykov et al: "Evolved and Designed Self-Reproducing Modular Robotics", IEEE Transactions on Robotics, IEEE Service Center, Piscataway, NJ, US, vol. 23, No. 2, Apr. 1, 2007 (Apr. 1, 2007), pp. 308-319, XP0III 76826, ISSN: 1552-3098, DOI:10.1109/TR0.2007.894685, Web link: https://ieeexplore.ieee.org/document/4154840.

*Primary Examiner* — Jake Cook
(74) *Attorney, Agent, or Firm* — Hoffmann & Baron, LLP (57) ABSTRACT

A Hardware Module for a robotic system includes at least one sensor for measuring an internal property of the Hardware Module, a communication unit for communicating with other Hardware Modules, a data storage unit and an embedded controller. The embedded controller is configured to collect collected data, the collected data including: status data representing the current status of the Hardware Module; and operating data representing usage of the Hardware (Continued)

Module wherein at least part of the collected data is determined from sensor data from the at least one sensor, and the embedded controller is configured to perform at least one of: storing the collected data on the data storage unit; and transmitting the collected data via the communication unit.

2 Claims, 4 Drawing Sheets

(51) Int. Cl.
*B25J 9/16* (2006.01)
*B25J 13/08* (2006.01)
*B25J 15/04* (2006.01)
*B25J 19/00* (2006.01)
*B25J 19/02* (2006.01)

(52) U.S. Cl.
CPC ....... *B25J 15/0408* (2013.01); *B25J 19/0004* (2013.01); *B25J 19/0025* (2013.01); *B25J 19/02* (2013.01)

(56) References Cited

U.S. PATENT DOCUMENTS

| | | | |
|---|---|---|---|
| 5,293,107 A | | 3/1994 | Akeel |
| 5,694,813 A | * | 12/1997 | McLaughlan ........ B25J 19/0029 248/52 |
| 6,153,828 A | * | 11/2000 | Murata ................ B25J 19/0029 174/505 |
| 6,636,781 B1 | | 10/2003 | Shen et al. |
| 9,475,199 B2 | | 10/2016 | Burridge et al. |
| 9,796,097 B2 | * | 10/2017 | Kirihara ................... B25J 17/02 |
| 10,099,367 B2 | * | 10/2018 | Hirabayashi ............... B25J 9/12 |
| 10,611,038 B2 | * | 4/2020 | Zhang .................. B25J 17/0241 |
| 10,647,009 B2 | * | 5/2020 | Cao ........................ H02G 11/02 |
| 2003/0010148 A1 | | 1/2003 | Okamoto et al. |
| 2010/0180711 A1 | | 7/2010 | Kilibarda et al. |

\* cited by examiner

HARDWARE MODULE FOR A ROBOTIC SYSTEM, AND MECHANICAL COUPLING

This application claims priority based on an International Application filed under the Patent Cooperation Treaty, PCT/EP2018/079325, filed on Oct. 25, 2018, which claims priority to EP 17 198 992.4, filed on Oct. 27, 2017.

BACKGROUND OF THE INVENTION

The invention relates to the field of modular robots. It relates to a hardware module for a robotic system, and a mechanical coupling.

In a manufacturing environment, today, manipulators are assigned to a specific tasks and cannot be easily adapted in terms of degree of freedom of movement, geometry, or of mechanical/physical capabilities to perform other kinds of tasks. Due to costs pressure, robots or manipulators are broadly used in production and companies want to maximize their ROI when buying robots. There is a need to make robots more flexible in terms of performance or actions.

Modular robots, assembled by combining hardware modules have been demonstrated in academic and experimental settings. They can however not be used in a productive industrial environment.

U.S. Pat. No. 9,475,199 B2 discloses a robotic arm. The arm includes: joints that can be attached and/or detached in a tool-free manner via a universal mating adapter; sensors for measuring information like tool performance and diagnostics; a controller for obtaining data from the sensors; and a control board for storing and exchanging data acquired by the sensors to different joints and tools present in a system. The universal mating adapter includes mechanisms and the ability to store and communicate parameter configurations such that the joints can be rearranged for immediate operation of the arm without further reprogramming, recompiling, or other software intervention. However, the portions of the arm do not comprise an embedded controller, and neither is their history locally stored.

US 20100180711 A1 discloses a robotic end effector system. The end effectors include a controller to receive feedback information gathered by sensors attached to the end effector, and communicate with various parts of the robotic system. The controller also contains a memory storage device. The end effectors can be rapidly attached or removed from the robot for ease change over to a different workpiece. On changing the end effector attached to the robot, the effector control system is placed in communication with robot control system that provide programs and instructions for the alternate end effector. This allows robot to be quickly re-tasked. However, the disclosure is limited to effectors, and does not consider manipulators built of several pluggable modules. Status and operating data are not collected by the embedded controller of the effector.

EP 1 287 868 A2 discloses an assemblage of robotic modules, each having memory capability, an actuator, a joint position sensor, communication means and a processing unit. A plurality of processing units from a plurality of modules is considered to constitute a distributed control unit.

U.S. Pat. No. 6,636,781 B1 describes distributed control and coordination of autonomous agents in a system. Members of a group of agents system are to self-configure and to synchronise their actions in order to accomplish a task as a group.

SUMMARY OF THE INVENTION

It is an object of the invention to create a hardware module for a robotic system, and a mechanical coupling of the type mentioned initially, which can be used to assemble a robot arm or manipulator that can be used in a more flexible manner.

These objects are achieved by a hardware module for a robotic system, and a mechanical coupling according to the invention.

According to a first aspect of the invention, a Hardware Module as described in the following is provided. Such a Hardware Module can be realised in combination with one or more elements of Hardware Modules according to a second aspect, and/or in combination with mechanical couplings according to a third aspect, or in an entirely independent manner.

The Hardware Module for a robotic system comprises at least one sensor for measuring an internal property of the Hardware Module, a communication unit for communicating with other Hardware Modules, a data storage unit and an embedded controller,
  the embedded controller being configured to collect collected data, the collected data comprising
    status data representing the current status of the Hardware Module; and
    operating data representing usage of the Hardware Module;
  wherein at least part of the collected data is determined from sensor data from the at least one sensor,
  and to perform at least one of
    storing the collected data on the data storage unit and
    transmitting the collected data via the communication unit.

The sensor data being transmitted can be transmitted without having been stored in the data storage unit, or it can be first stored in the data storage unit, then retrieved from storage and then transmitted.

The internal property of the Hardware Module that is measured by the sensor is, for example, a relative position of a joint of the Hardware Module, or a position of an actuator, or a temperature inside the Hardware Module, an elongation of parts of the Hardware Module (measured e.g. by strain gauges), forces and torques acting on the Hardware Module, vibrations occurring during operation of the Hardware Module, etc. Some of such internal properties can be used in the Hardware Module itself for controlling operation of the Hardware Module, such as a joint position measurement being used to control a corresponding joint actuator. Internal properties can be used to detect malfunctions, critical conditions that need maintenance, or for adjusting calibration parameters, etc. Some internal properties can be stored and/or transmitted without being used by the embedded controller for the operation of the Hardware Module itself.

A Hardware Module can be considered to be a smart pluggable module. A module being pluggable means that it can be connected both on a hardware level and on a software or communication level by means of a standardised interface. A module being smart means that it comprises a computing unit with data storage and data processing elements that allow the Hardware Module to, e.g. perform data processing, and with communication elements for communicating with other Hardware Modules. The computing unit can be implemented by means of a variety of hardware entities, from an embedded controller over a controlling computer to cloud based processing units.

Hardware Modules can be configured to receive software updates and/or configuration updates in order to maintain compatibility with other Hardware Modules.

Hardware Modules can be configured to receive software upgrades for adding new functionalities. This can be data processing software for a sensor, e.g. image analysis software for a camera, or a new motor control algorithm for a manipulator module.

A Hardware Module can be
  a manipulator module.
  a sensor module comprising at least one sensor, and an embedded controller as the computing unit, for processing raw sensor data acquired by the sensor and communicating with other Hardware Modules, in particular for transmitting processed sensor data to other Hardware Modules.

A Hardware Module that comprises a joint and actuator for e.g. rotary or translational movement is called an active module. A Hardware Module that has a fixed geometry or fixed geometric configuration is called passive module. A sensor module as a rule is a passive module. An extender module, which for example extends the length of a robot arm but has no joint, is a passive module.

In embodiments, the Hardware Module stores, e.g. in its data storage unit, a description of physical characteristics of the Hardware Module. This description comprises one or more of mechanical, electrical and component parameters such as:
  geometrical dimensions;
  weight;
  type of actuator;
  force or torque generated by an actuator;
  speed of movement of an actuator;
  type of sensor;
  resolution of sensor;
  accuracy of sensor;
  and tolerance ranges for such parameters.

The physical characteristics usually are determined by the physical construction of the Hardware Module and its components. They can remain fixed over time, or they can change. A change can be detected by sensors in the Hardware Module itself, or by interaction of the Hardware Module with other Hardware Modules—which can be manipulator modules and/or sensor modules—in particular by performing calibration routines. For each parameter, a current value can be stored, and optionally also historic data with previous values. This represents changes of the parameter over time.

In embodiments, the description of a current status of the Hardware Module comprises one or more of:
  an internal state of the Hardware Module;
  a list of other Hardware Modules that the Hardware Module is physically connected to; this can represent just adjacent Hardware Modules that are attached to the Hardware Module itself (and not Hardware Modules that are only indirectly connected, via other ones);
  parameters of such a connection;
  a list of Software Modules currently installed on the Hardware Module;
  the geographical location of the Hardware Module; this can represent a storage facility or a factory location, and can be used for assessing the availability of the Module and transport times and effort for transporting it to the location where it is to be used;
  a list of other Hardware Modules that the Hardware Module is configured to communicate or cooperate with;
  a list of Software Modules that the Hardware Module is configured to communicate with or that the Hardware Module is associated with.

The current status represents the status data, therefore status data comprises, e.g. data on the internal state, the other Hardware Modules that the Hardware Module is physically connected to, etc. The internal state can be a temperature inside the Hardware Module, the position of a joint that is part of the Hardware Module, which in this case can be a manipulator module, etc.

The software modules associated with the Hardware Module can obviously be software that is executed on the Hardware Module, but they can also be "related" in that they process data acquired by the Hardware Module, e.g. image processing software for a hardware camera, or in that they determine data that is used in operation of the Hardware Module, e.g. calibration software that computes calibration parameters (from calibration data determined by the same Hardware Module, or from data obtained by other Hardware Modules, in particular, sensors).

In embodiments, the Hardware Module stores, e.g. in its data storage unit, historical data representing usage of the Hardware Module.

In embodiments, the operating data and the historical data comprise one or more of:
  total time of operation;
  logged values of operating data;
  statistical values of operating data;
  number of cycles performed;
  types of malfunctions;
  statistics on malfunctions;
  time and/or cost for eliminating malfunctions;
  downtime caused by malfunctions;
  how a particular malfunction was eliminated;
  statistical and other values derived from other historical data;
  a log of maintenance actions.

The historical data can be derived from the operating data, and data can comprise data on when and how long a Hardware Module or components of the Hardware Module were in operation, and parameters used in their operation. For example, operating data can state when device, e.g. a motor was switched on, what power it operated at, and when it was switched off. Operating data can comprise values of physical properties, in particular mechanical or electrical properties. Mechanical properties can be forces, torques, speeds, paths travelled, etc. Electrical properties can be currents, voltages, power, etc. Operating data can be determined by the embedded controller—for parameters that are controlled by the embedded controller itself—or from sensor data obtained from the at least one sensor.

Historical data can also comprise entries that are in part or wholly generated by humans, such as how a particular malfunction was eliminated or a log of maintenance actions with the number, date, frequency of maintenance actions, and with individual steps taken during maintenance. Information about malfunctions can be generated automatically. If a Hardware Module is exchanged because of repairs or maintenance, it is replaced by a similar Hardware Module with a different identity, which is recorded by the system, either automatically or manually. If a Hardware Module is repaired but remains in place, this is recorded in its history.

In embodiments, the Hardware Module is a manipulator module comprising two mechanical links connected by a joint, an actuator for setting a position of the joint and thereby a relative position of the links.

This differentiates active Hardware Modules—having joints—from passive modules, which do not have joints, but can comprise zero, one or more sensors, an embedded controller, data storage unit and communication unit. Such a passive module can detect the orientation in which it is coupled to an adjacent Hardware Module, and can comprise, in its data storage unit, calibration parameters regarding its geometry.

In embodiments, the Hardware Module is a manipulator module comprising two mechanical links connected by a rotary joint, each link comprising an interface adapted to connecting it to an interface of another Hardware Module, and wherein when the joint is in a first position the two interfaces are parallel to each other, and when the joint is in a second position rotated 180° relative to the first position the two interfaces are at a right angle to each other.

In more detail, this means that a first interface can be assigned a first plane which is in a fixed spatial relation to the first interface, and the second interface can be assigned a corresponding second plane, which is in a fixed spatial relation to the second interface. Then, when the joint is in the first position the two planes are parallel to each other, and when the joint is in the second position, the two planes are at a right angle to each other.

A set of at least two Hardware Modules, a first and a second one, can have their interfaces configured such that by the same interfaces, the first and the second Hardware Modules can be connected to one another in one of at least two different relative spatial positions, the two different positions being related by a rotation of one of the Hardware Modules by 180° and/or 90° relative to the other.

Each interface comprises interface elements as mechanical and electrical and communication connection elements. The electrical interface elements can transmit power and can also operate or be used as communication interfaces.

In embodiments, interfaces are typically located at extremities of the modules, or on a base Hardware Module of the robotic assembly. Each Hardware Module has at least one and a maximum of five interfaces. The interfaces are flat or angled, preferably oriented at 45° thus allowing to make straight or right-angled connections. They comprise physical means to ensure the mechanical and electrical connection functions between each modules. Each interface can be plugged in at least two different orientations, thus comprising at least two sets of symmetrically arranged connecting means. The interface ensures accurate positioning and strong fixation of the Hardware Modules. This function is completed by a single type of elements or is split, using two different types of elements:

Examples of mechanical connections using a single type of element are, but are not limited to: screwing, clamping, eccentric hole connections.

Example of split mechanical connections: Magnetic connection: Ensure/guiding physical connection—should be combined with mechanical connection The base Hardware Module can comprise an acceleration sensor. This allows it to determine its spatial orientation, which can depend on, for example, whether it is mounted on a floor, wall or ceiling. This information can be used to adapt motion control of the Hardware Modules attached to the base Hardware Module.

Electrical connections can implement

Inductive power supply connection: Power, from the (n−1)-th smart module or from a base Hardware Module of the robotic assembly is sent through an inductive coupling to the n-th Hardware Module which can use that energy to run.

Power-line communication: a PLC/PLN/PDSL-DC-Bus can be used for data transmission over the same physical connection as the power supply. This reduces space requirements and interface costs.

In embodiments, the Hardware Module comprises a first interface and second interface, and a channel passing from the first interface to the second interface through the inside of the Hardware Module.

Such a channel can be used to guide wires, cables, fibres, fluids or flowable substances etc. through one Hardware Module or a sequence of connected Hardware Modules.

In general, such a channel can be external (visible) or internal to the Hardware Module, preferably an internal or inner channel and more preferably having a central position into the module. The channel's function enables customisation of the robot system or assembly: cables can be added, or the channel can be used to conduct fluids like glue, resin, oil, air, vacuum . . . for dispensing and/or aspirating such fluids. In the case of an external channel, it could be fixed externally once the robot assembly is mounted thanks to a guiding system. In the case of an internal channel, it can be made of the robot's material (steel, stainless steel, aluminium, . . . ) and can be lined in order to have chemical resistance to fluids, or enabling a better fluids flow or an easier passage of the cables. Cables can be electrical cables, optical fibers, convey 3D printing filaments, etc. . . .

In embodiments, the data storage unit stores calibration data that represents relative positions and orientations of the joint and the two links.

In particular, this calibration data can represent relative positions and orientations between the joint and the first interface, and between the link and the second interface, and calibration data related to the joint itself, reflecting errors or deviations from nominal values in the joint. Generally, calibration data can be expressed in terms of absolute values or in terms of deviations or errors relative to a reference values.

For passive Hardware Modules, which do not comprise a link, the calibration data can represent relative positions and orientations between the first and second link interface.

Calibration data can also define procedures for adapting calibration parameters in accordance with conditions affecting the Hardware Module. Such conditions can comprise temperatures, such as ambient and internal temperatures, loads acting on the Hardware Module etc.

Calibration data can be determined after the Hardware Module has been manufactured and/or later, by means of dedicated calibration procedures performed on the Hardware Module in a test setting. Calibration can also be performed with the Hardware Module being installed in combination with other Hardware Modules, either by means of dedicated calibration procedures or with procedures based on sensor data acquired during normal or productive operation of the Hardware Modules.

In embodiments, the actuator comprises a motor driving the position of the joint via a transmission, and a first position sensor for measuring a actuator position (of the motor) at an input side of the transmission (at which the transmission is driven by the motor) and a second position sensor for measuring an actuator position at an output side of the transmission (where the transmission drives the joint), and a load estimator arranged to estimate a load acting on the joint from the actuator positions at the input and output sides of the transmission.

In embodiments, this is done by the load estimator scaling the actuator positions at the input and output sides of the transmission to a common scale, and estimating the load from the difference of the scaled actuator positions and from a spring rate that represents a resilience of the transmission (Typically, the positions are rotary positions). In other words, a load on the joint causes the transmission to flex, whereby the degree to which it flexes is a function of the load and of the elasticity or resilience of the transmission. The degree to which it flexes results in a difference of positions at the input and output of the transmission. When determining this difference, the transmission ratio must be taken into account. This is done by scaling the positions or changes in position. For example, a position at the transmission input is multiplied by the transmission ratio, resulting in a corresponding scaled position at the transmission output. If this scaled position differs from the position measured at the output, this difference is due to a load on the joint that causes the transmission to yield.

Measuring a load on the joint can be used to sense external forces acting on a manipulator. This in turn can be used for collision detection, and controlling a robot to comply with external forces. This in turn can be necessary for compliance with safety requirements for collaborative human-robot arrangements.

In embodiments, the Hardware Module comprises a brake arranged to inhibit movement of the joint, the brake being a friction brake.

The brake can be configured to apply a braking force or torque when the Hardware Module is powered down and/or in the event of an emergency stop. The friction brake can be configured to hold the joint with a predetermined force or torque, corresponding to a predetermined maximum braking torque. This in turn allows a user to move the joint, even when the Hardware Module is powered down, by manually applying a larger torque. This ability to move a robot arm can be required for collaborative human-machine systems, as specified e.g. in ISO/TS 15066.

In embodiments, the Hardware Module comprises a brake arranged to inhibit movement of the joint, the brake being arranged to establish a mechanical form fit that inhibits movement of the joint.

The brake can be configured to lock movement of the joint when the Hardware Module is powered down and/or in the event of an emergency stop.

In embodiments, the brake allows a predetermined amount of backlash. If this is the case, a user can move the joint within a range corresponding to this backlash, even when the Hardware Module is powered down, by manually applying a torque to the joint. The backlash can correspond to, for example, a joint angle of 1° or 2° or 5° or 10° or 15°. or 20°.

According to a second aspect of the invention, a Hardware Module as described in the following is provided. Such a Hardware Module can be realised in combination with one or more elements of Hardware Modules according to the first aspect, and/or in combination with mechanical couplings according to a third aspect, or in an entirely independent manner.

Such a Hardware Module for a robotic system comprises two mechanical links connected by a rotary joint and a flexible conduit,
and a cylindrical conduit guiding space defined by a hollow space between an inner cylinder wall and an outer cylinder wall, the two cylinder walls extending from a first end to a second end of the hollow space and being coaxial with one another and with the axis of the joint,
the conduit being at a first end attached to the first link and guided from there into the hollow space at the first end of the hollow space, and
the conduit being at a second end attached to the second link and guided from there into the hollow space at the second end of the hollow space,
the length of the conduit between the first end and the second end allowing for a relative rotation of at least 180° or at least 270° or at least 360° or at least 720° between the first link and the second link.

This allows to keep the conduit enclosed inside the Hardware Module. Links between conduits of adjacent Hardware Modules can be implemented as parts of interfaces of the Hardware Module, with the result that the all connections between Hardware Modules are made via the interfaces. This results in fully modular Hardware Modules, without the need for conduits, cables and the like having to be installed after the Hardware Modules have been assembled. Furthermore, the use of slip rings and their disadvantages is avoided.

In embodiments, the inner cylinder wall surrounds further elements of the joint, in particular at least one of the actuator, embedded controller, data storage unit and communication unit.

The hollow space can thus be arranged at the outside of the joint, allowing for a relatively large diameter, which in turn allows for a large bending radius of the conduit.

The conduit can be arranged to carry electrical cables for power and/or for communication. The conduit can itself be such a cable. The conduit can be arranged to carry flowable substances.

The joint axis can intersect the first interface and/or the second interface.

The joint axis can be at a 45° angle to a first interface plane and/or to a second interface plane of the respective interface.

According to a third aspect of the invention, a mechanical coupling as described in the following is provided. Such a Hardware Module can be realised in combination with one or more elements of Hardware Modules according to the first aspect, and/or one or more elements of Hardware Modules according to the second aspect, or in an entirely independent manner.

A mechanical coupling, preferably for coupling Hardware Modules as described herein, comprises a first interface with a first interface plane and a second interface with a second interface plane, the first interface and second interface being designed to be coupled by the first interface plane being placed against the second interface plane, the mechanical coupling comprising one or more spring loaded locking couplings and one or more positioning couplings, wherein, when the coupling is established, the locking couplings pull the first and second interface plane against one another, and, with forces acting parallel to the first and second interface plane, push contact surfaces of the positioning couplings, against one another.

Because the locking couplings are spring loaded, the resulting stable relative position and orientation between the first interface and the second interface is defined
  by the first and second interface planes, constraining one translational and two rotational degrees of freedom between the two interfaces, and
  by the contact surfaces of the positioning couplings, constraining the remaining two translational and one rotational degrees of freedom.

In more detail, at each of the one or more positioning couplings, a first contact surface of a first positioning coupling element of the positioning coupling is pushed against a second contact surface of a second positioning coupling element of the positioning coupling. The first positioning coupling element can be a locking pin and the second positioning coupling element can be a locking hole with a fixing cam, or vice versa.

Normal vectors of the first and second contact surfaces typically are parallel to the respective first and second interface planes. Thus, these contact surfaces do not constrain the relative position of the coupling partners in the direction normal to the interface planes. These contact surfaces can slide on one another in the direction normal to the interface planes, with the relative position of the coupling partners, seen in a projection onto the interface planes, remaining unchanged. When these contact surfaces are pushed against one another, a resulting contact force vector lies parallel to the interface planes.

Typically, the interface planes are machined as a single surface on a single piece of material, typically metal. However, they can alternatively each comprise several separate but coplanar surfaces.

In embodiments, the mechanical coupling comprises at least two locking couplings, and at least one positioning coupling, the at least two locking couplings being arranged to exert a torque between the first interface and the second interface, and the at least one positioning coupling defining the relative position of the first interface and second interface by respective contact surfaces being pressed against one another by the torque.

In embodiments, the mechanical coupling comprises at least two locking couplings, and at least two positioning couplings, the at least two locking couplings being arranged to exert a torque between the first interface and the second interface, and the at least two positioning couplings defining the relative position and orientation of the first interface and second interface by, for at least one or for each positioning coupling, respective contact surfaces being pressed against one another by the torque.

This arrangement allows for repeatability with high accuracy with regard to relative angles (or relative orientation) of the objects or modules that are coupled together. Two angles are defined with high precision by the interface planes being in contact with each other. The remaining angle, corresponding to rotation around an axis normal on the interface planes, is defined by the positioning couplings.

In embodiments, one of the positioning couplings comprises a central positioning pin and positioning hole. This defines the relative position in the interface plane. The relative orientation in the interface, around the central positioning pin, is defined by another positioning coupling comprising an off-centre positioning pin and corresponding positioning hole, whose contact surfaces are pressed against one another by the torque.

In embodiments, both of the positioning couplings each comprise an off-centre positioning pin and corresponding positioning hole. Both the relative position and the relative orientation in the interface are defined by their contact surfaces being pressed against one another by the torque.

In embodiments, the mechanical coupling comprises four locking couplings, and two positioning couplings, the four locking couplings being arranged to exert a torque between the first interface and the second interface, and the two positioning couplings defining the relative position and orientation of the first interface and second interface by, for each positioning coupling, respective contact surfaces being pressed against one another by the torque.

Here too, one of the positioning couplings can be a central one and the other off-centre, or both can be off-centre.

This arrangement allows for a quasi optimal repeatability with high accuracy with regard to relative angles (or relative orientation) of the objects or modules that are coupled together. The angles are defined as in the preceding embodiment. The four locking couplings can be arranged in a symmetric manner, generating a torque for the rotation around the axis normal on the interface planes in a symmetric manner as well.

In embodiments, the forces exerted by the at least two locking couplings and acting parallel to the first and second interface plane are balanced by forces acting where the contact surfaces of the positioning couplings are pushed against one another, and at least one of the following holds:
  at one or more or all of the positioning couplings, the forces acting between the contact surfaces of the positioning coupling are at least approximately normal to the contact surfaces;
  the locking couplings define a centre point of the locking couplings, and the distance of each of the positioning couplings to the centre point of the locking couplings is the same;
  the configuration of locking couplings and positioning couplings allows to couple the interfaces in at least two different relative spatial positions, the two different positions being related by a rotation, around an axis normal to the first and second interface plane, of one of the interfaces by 180° and/or 90° relative to the other.

If there are exactly two locking couplings, then their centre point can be the midpoint between the two. If there are three or more, then the centre point can be the centre of gravity of the convex polygon that has the locking couplings as its vertices.

The distance of each the locking couplings to the centre point can also be the same as the distance of each of the positioning couplings to the centre point.

In embodiments, the first interface comprises a connector plug, and the second interface comprises at least a first and a second connector jack, and the first interface and the second interface can be coupled to one another, with the first interface plane placed against the second interface plane, in at least a first relative position in which the connector plug engages the first connector jack and in a second relative position in which the connector plug engages the second connector jack.

Then, the Hardware Module comprising the second interface can determine the relative position of the first interface and second interface by determining which of the connector jacks is engaged with the connector plug. The embedded controller can be configured to do determine this.

In embodiments, automatically determining a computational model of the robotic system can comprise the steps of
  automatically determining a physical configuration of the robotic system by determining, for each Hardware Module of the robotic system,
    an associated Hardware Module Description comprising a description of physical characteristics of the Hardware Module;
    its geometric relation to one or more adjacent Hardware Modules;
    the identity of one or more adjacent Hardware Modules.

The Hardware Module Description can be retrieved from a database, i.e. an Inventory, that is separate from the Hardware Module, or as stored in Hardware Module itself.

The geometric relation of a Hardware Module to one or more adjacent Hardware Modules; can be determined from the spatial relation between interfaces of the Hardware Modules. Together with joint positions of each Hardware Module, the complete configuration of the kinematic link formed by the Hardware Modules is determined.

The physical characteristics can comprise at least parameters of a kinematic link formed by the Hardware Modules, such as Denavit-Hartenberg parameters. These can be sufficient for motion trajectory planning. The physical characteristics can also comprise approximate or exact 3D body models of the Hardware Modules. These can be combined to form a 3D model of the robotic system that can implement collision avoidance as part of motion trajectory planning.

Plugging a manipulator module into a modular robot system can provide at least two types of information to a central computation and command unit (CCC), such as: The position and functions of the said modules with respect to the said assembly;

The physical characteristics of the said modules and its tolerances for those physical characteristics, wherein the said physical characteristics can comprise weight, or speed ranges, or force ranges, or length ranges of the said modules;

History: maintenance, usage, number of cycles performed;

Information transmitted by the module itself to the Module inventory: active/updated library.

In embodiments, the method for operating the robotic system comprises, for automatically determining the geometric relation of a Hardware Module to one or more adjacent Hardware Modules, the step of determining which of several possible relative spatial positions two adjacent Hardware Modules are in, from sensors embedded in at least one of the interfaces that connect the adjacent Hardware Modules; or from user input.

In embodiments, the method for operating the robotic system comprises the following step for automatically determining the identity of one or more adjacent Hardware Modules:

sensors arranged to observe the Hardware Modules determining the identity of one or more Hardware Modules.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION

Figure 1:
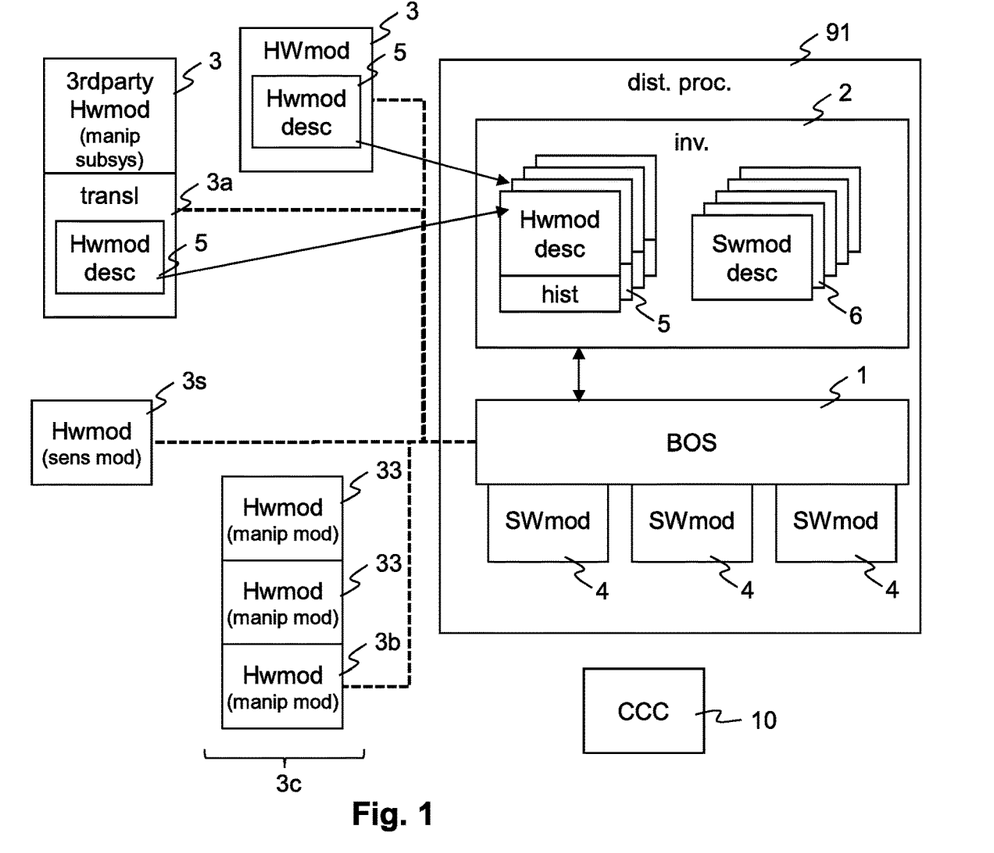
FIG. 1 elements of a robot system.

FIG. 1 schematically gives an overview of elements of a robot system, comprising Hardware Modules 3 and Software Modules 4, collectively referred to as "modules". In the real world, Hardware Modules 3 are combined and configured to work as actuators and sensors. Hardware Modules 3 can be physically connected to form manipulators such as robot arms.

Hardware Modules 3 can be manipulator modules 33, and a set of connected manipulator modules 33, connected to a base Hardware Module 3b, forms a robotic system or robotic assembly 3c.

Hardware Modules

A Hardware Module 3 can be, e.g., a manipulator module 33, a base Hardware Module 3b, a central computation and command unit (CCC) 10, or a sensor module 3s, or a legacy device connected and controlled through a compatibiliser unit or translator 3a.

A manipulator module 33, in addition to having a computing unit as the other types of Hardware Modules 3, comprises an actuator 39.

Figure 2:
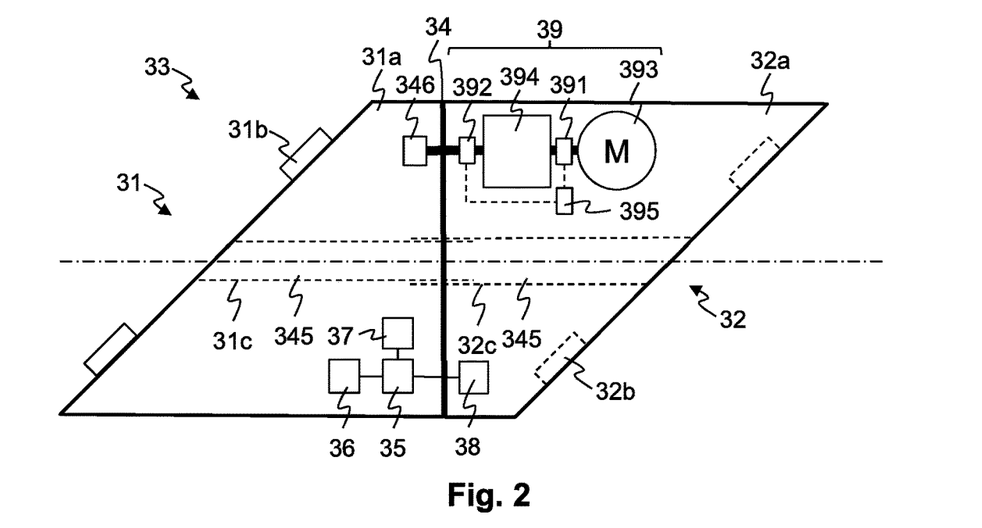
FIG. 2 a manipulator module.

FIG. 2 schematically shows a manipulator module 33 with an embedded controller 35 arranged to control an actuator 39, read sensor data from one or more sensors 38, e.g. for forces and torques generate by or acting on the manipulator module, store data to and retrieve data from a local data storage unit 36, and communicate through a communication unit 37 with other Hardware Modules 3 and/or a central control unit.

The actuator 39 comprises a motor 393 driving a transmission 394 which in turn drives the joint 34, that is, sets the relative position of the links joined by the joint 34. A first position sensor 391 is arranged to measure the (angular) position of the actuator 39 between the motor 393 and the transmission 394, that is, at an input side of the transmission 394. A first position sensor 391 is arranged to measure the (angular) position of the actuator 39 between the transmission 394 and the joint 34, that is, at an output side of the transmission 394.

The first position sensor 391 can be an incremental sensor and can be used to control the motor 393. The second position sensor 392 can be an absolute value sensor and can be used to measure a position of the joint 34, especially when powering up the Hardware Module 3. With this combination, the accuracy of the incremental first position sensor 391 is complemented by the ability of the second position sensor 392 to determine the joint position without having to move the joint to a reference position for establishing a reference for the incremental sensor. Also, once the Hardware Module 3 is powered up, differences in readings from the two sensors, combined with information about an elasticity or resilience of the transmission 394, can be used to determine a load acting on the joint 34. A load estimator 395 is configured to determine such a load based on readings from the first position sensor 391 and second position sensor 392.

A brake 396 is arranged to inhibit motion of the joint 34. It prevent the Hardware Module 3, and a combination of Hardware Modules 3 forming a robotic arm, from moving under its own weight when it is powered down. The brake can be arranged to be automatically activated when the Hardware Module 3 loses power or is shut down in a controlled manner. The brake 396 can be a friction brake, and can have its braking force limited such that the joint 34 can be used by an operator. Alternatively, the brake 396 can establish a mechanical form fit that locks the relative movement in the joint. In this case, the brake 396 can allow for a certain backlash, again in order to allow an operator to move the joint 34 at least to a certain degree.

A channel 345 leads from the first interface 31 to the second interface 32. It runs, at least in a region of the joint 34, coaxially to the axis of the joint 34. The channel 345 can comprise two tube sections sliding in one another with a fluid-tight connection. In this way, with two or more Hardware Modules 3 coupled by their interfaces, a channel leading through these Hardware Modules 3 is created.

The computing unit of a manipulator module 33 typically is an embedded controller 35. A manipulator module can be physically connected, by means of one, two or more physical connections or interfaces 31, 32, to other manipulator modules, which together form a modular manipulator system or assembly. A physical connection or interface 31, 32, typically comprises a mechanical interface with mechanical connection elements for connecting the manipulator module to other manipulator modules, and an electrical interface with electrical connection elements for communication and power links. The manipulator module 33 is able to communicate with these other manipulator modules, to determine their identity and to exchange its identity and parameters with them and optionally with a CCC unit. By actuating the actuator 39, a geometric relation between two or more mechanical interfaces 31, 32, can be set. For brevity, such a relation can be described in terms of a joint position of the manipulator module. If the manipulator module implements a rotary joint, then the joint position is described by an angle, and the geometric relation between the mechanical interfaces can is determined by this angle and the geometric relations between the joint and each of the mechanical interfaces.

Main functions tasks of the embedded controller 35 can be:
- identification of the Hardware Modules' 3 characteristics: geometry, physical data . . . .
- determine the relative or absolute position of the module within the robot assembly by the central computation and command unit 10;
- data transfer to a central computation and command unit 10;
- receive, understand, and translate into action commands from the central computation and command unit 10;
- drive and regulate one or more actuators 39;
- add new functionalities to its own software;
- upgrade its software to keep compatibility with software of the central computation and command unit 10;
- read, collect process and store interpret data from sensors;
- collect, list, communicate and store data—for example, for establishing history data for maintenance and calibration purposes Each Hardware Module 3 knows its characteristics and is able to describe itself. Each module is characterized by at least two types of parameters amongst
- i) its position in the robot assembly,
- ii) its function (active or passive), and in the case of active function, the exact function: joint, effector, telescopic arm for handling, gluing . . . .
- iii) its geometrical properties: weight, inertia, length, diameter, external dimensions, channel dimensions, —mechanical properties depends on the quality of parts and materials—
- iv) its mechanical properties/resistance: speed, force, torque, movement dimensions, reactivity . . . .
- v) its tolerances regarding each parameter giving an operating window per module. Each smart pluggable module is unique and has its own control loop,
- vi) its history: number of cycles. Maintenance dates and actions, sensor related historical data . . . .
- vii) its calibration data Each Hardware Module 3 can understand and implement commands from the central computation and command unit 10, and can turn it into action. An action can be a movement, but can be also wait, sleep, transfer data, etc.

Sensors 38 are driven by the embedded intelligence or embedded controller 35 of the module. Their functions can be of one of three types:
- positioning: to drive the actuator(s) based on position sensor feedback;
- system control: to support realisation of an action or give indication on the result of the action;
- maintenance/reliability:
  - to give indications about the ageing of the modules itself;
  - to give indications on other Hardware Modules located in the vicinity and observed by the sensor(s);

Sensor readings can be transmitted to the embedded controller 35 through wire-based or wireless channels. Examples for properties measured by sensors are temperature, humidity, accelerometer, vibration, acoustical signals, etc.

The manipulator module 33 comprises two mechanical links, a first link 31*a* and second link 32*a*, a relative position between these links being controllable through the actuator 39. The first link 31*a* comprises a first interface 31, and the second link 32*a* comprises a second interface 32. Each of the interfaces 31, 32 comprises interface elements 31*b*, 32*b* as mechanical and electrical and communication connection elements.

Figure 3:
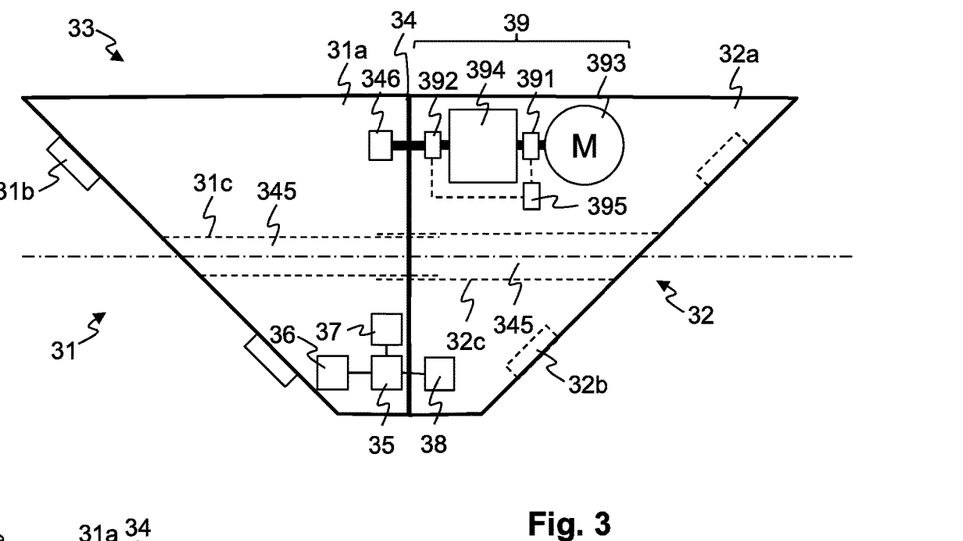
FIG. 3 a manipulator module in a different joint position.

In the present example, the joint 34 is a rotary joint, and the first interface 31 and second interface 32 lie in planes that are at an angle of essentially 45° to the axis of rotation of the rotary joint 34. This allows to rotate the two interfaces from a position in which they are parallel to one another, as shown in FIG. 2, to a position in which they are at a right angle, as shown in FIG. 3.

Figure 4A:
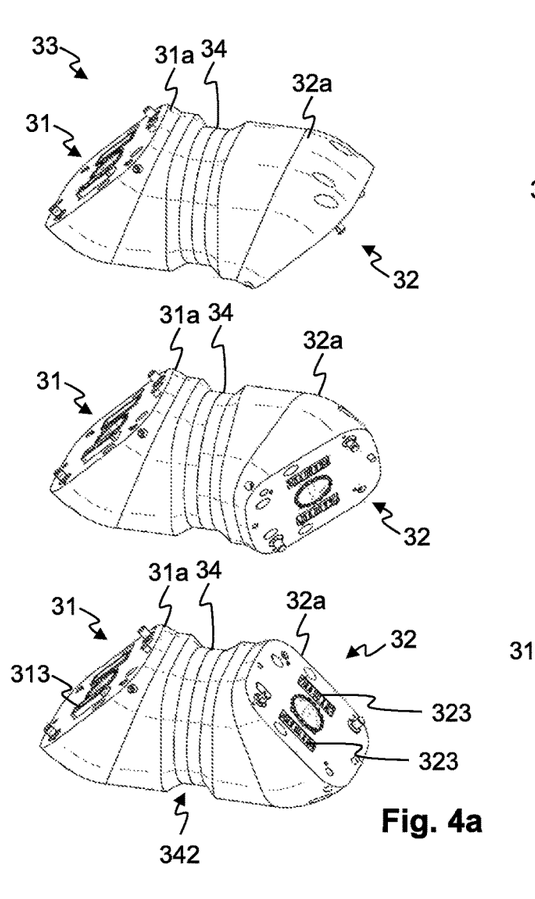
FIG. 4a another manipulator module, at different joint positions.

FIG. 4*a* shows another manipulator module 33, at different joint positions. The elements that are schematically shown in FIG. 3 are encased or housed within respective housings of the first link 31*a* and second link 32*a*.

Figure 4B:
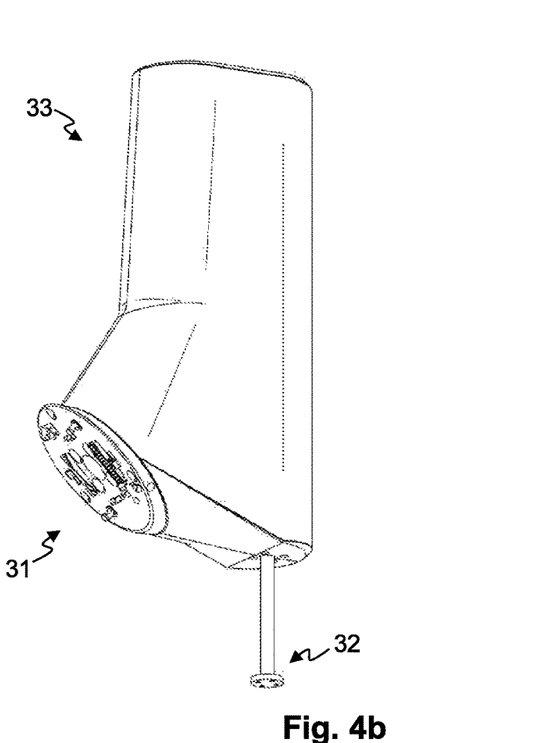
FIG. 4b a manipulator module with a combined rotary and linear joint.

FIG. 4*b* shows another manipulator module 33, with a combined rotary and linear joint. The second interface 32 can be rudimentary in that it comprises only mechanical connection elements. The second interface 32 is attached to an elongated cylindrical element, which can be moved linearly or translationally along its cylinder axis and can be rotated about this axis.

Figure 5:
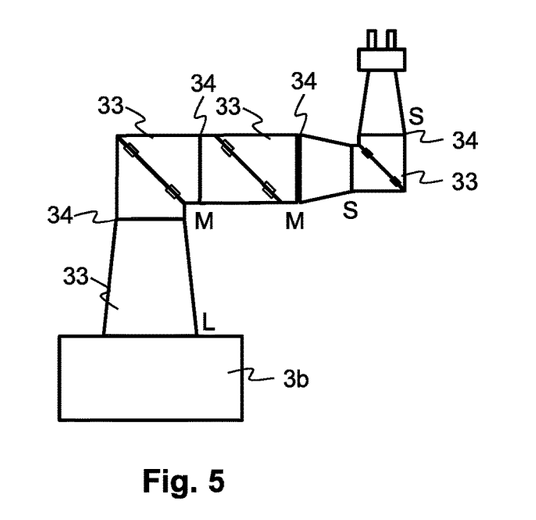
FIG. 5 a physical structure of a robot system or assembly.

FIG. 5 schematically shows a physical structure of a robot system or assembly, with manipulator modules 33 connected to form a sequential structure, starting with a base Hardware Module 3*b*. In other embodiments, not shown, more than one sequence of manipulator modules 33 can be based on the same base Hardware Module 3*b*. In further embodiments, not shown, manipulator modules 33 or Hardware Modules 3 in general have more than two interfaces, and thus tree-like structures can be assembled with them. The figure also symbolically shows different sizes of Hardware Modules 3 and corresponding interface types, ranging from "Large" (L) to "Medium" (M) to "Small" (S) in this example. Generally, sizes and interface types get smaller for Hardware Modules 3 that are further away from the base 3*b*.

Figure 6:
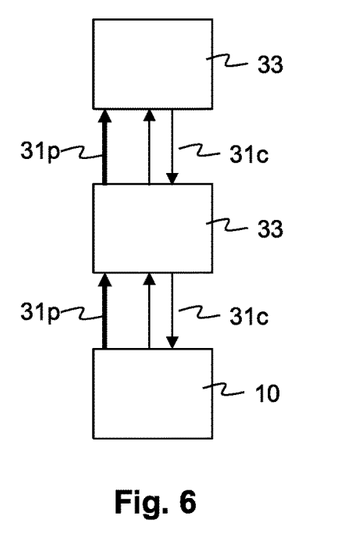
FIG. 6 an interface structure of a robot system or assembly.

FIG. 6 schematically shows an interface structure of a robot system or assembly: power supply lines 31*p* and communication lines 31*c* run, starting from a central computation and command unit 10, sequentially through the manipulator modules 33. The communication lines 31*c* can be physically separate lines for the two directions of communication, from and to the central computation and command unit 10, or both directions of communication can pass through the same physical lines, e.g. a communication bus. In embodiments, the same communication lines 31*c* and communication protocol running on these lines are used for controlling movement of the (joints 34 of the) Hardware Modules 3, transmitting sensor data and for reading or writing status data, operating data, historical data etc.
Communication Communication ensures communication signal transmission through manipulator modules 33 of the robot system or assembly and with the central computation and command unit 10. It can use buses passing through the manipulator modules 33, such as Ethernet, Ethercat, (ISO 15745) CAN, optical fiber-based, or wireless communication means, for example, LTE, LTE-Advanced, Wi-Fi, Bluetooth, NFC or a combination thereof. Communication can be with broadcast or with point to point protocols.

Data can be continuously exchanged or stored until required for action's implementation.

Each module has at least a transmitter and a receiver port to communicate with its neighbour. When a Hardware Module 3 has two or n neighbours, then the module can be equipped with two or n transmitters, and two or n receivers.

Figure 7A:
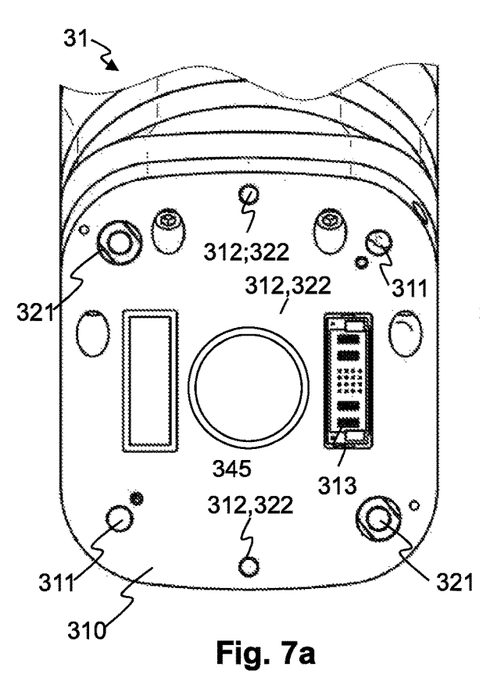
FIG. 7a-b corresponding interfaces.
Figure 7B:
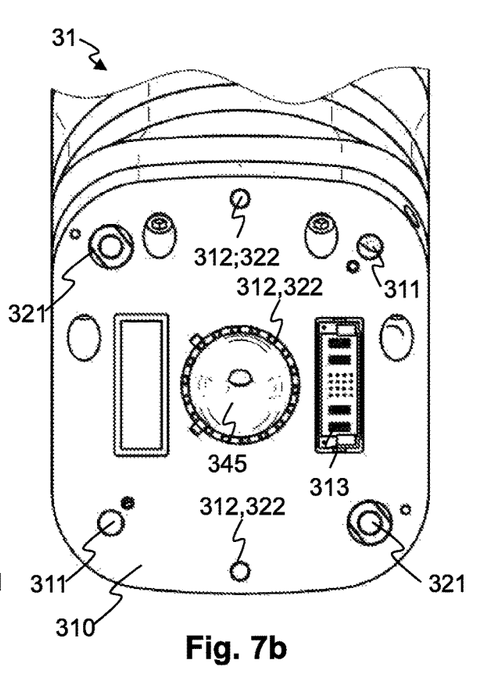

FIGS. 7a and 7b each schematically shows one of a pair of matching interfaces. The figures each schematically show a first interface 31. A matching second interface 32, configured to be coupled to the first, looks essentially the same except that it can have two connector jacks 323 where the first shows only one connector plug 313 and an empty rectangle. Furthermore, various configurations for assigning locking and positioning pins and holes to two matching interfaces are possible, as explained further down. The figures thus show the location of pins and holes, and the assignment of either a pin or hole to a particular interface can vary. The interfaces are shown in a view onto a respective interface plane, seen from the outside of the respective Hardware Module.

The first interface 31 comprises a number of locking pins 311 and positioning pins 312, and a connector plug 313. These elements are arranged to protrude from an otherwise flat or planar first interface plane 310. The second interface 32 comprises corresponding locking holes 321 and positioning holes 322, and two connector jacks 323. The connector plug 313 and connector jacks 323 can be elastically or resiliently mounted, in order to compensate for inaccuracies in their relative position without placing an undue lateral load (in the interface plane) on the electrical connectors. When the interfaces are coupled,
- the locking pins 311 are mated with corresponding locking holes 321, each pair of locking pins 311 and locking holes 321 forming a locking coupling;
- the positioning pins 312 are mated with corresponding positioning holes 322, each pair of positioning pins 312 and positioning holes 322 forming a positioning coupling;
- a the connector plug 313 is mated with one of the connector jacks 323.

Typically, the second interface 32 is arranged on a Hardware Module 3 that is closer to a base of a manipulator assembled from a set of such Hardware Modules 3.

The Hardware Module 3 comprising the interface with the two connector jacks 323 can determine which of its connector jacks 323 is plugged into the connector plug 313. From this, it can determine in which of the two possible two relative orientations (rotated by 180°) the two Hardware Modules 3 are coupled together.

In order to couple two matching interfaces, one of the two possible relative orientations is chosen, and the first interface plane 310 and second interface plane 320 are placed against one another, with the locking pins 311 fitting into the locking holes 321 and the positioning pins 312 fitting into the positioning holes 322. Therein, the positioning pins and holes can be central or off-centre. As explained further below with regard to FIGS. 8a-c, the locking connectors comprise cam elements 3210 which are rotated and thereby first pull the interface planes against one another and then exert a relative force on the interfaces, parallel to the interface planes. These individual locking forces add up to create a locking torque around an axis that is normal to the interface planes. This torque pushes contact surfaces of the positioning couplings 312, 322 against one another. That is, a contact surface of a first positioning pin 312 is pushed against a contact surface of a corresponding first positioning hole 322, and a contact surface of a second positioning pin 312 is pushed against a contact surface of a corresponding second positioning hole 322. The location of these contact surfaces defines the relative orientation or rotation of the two interfaces around an axis normal to the interface planes. It also defines the relative translation in the two dimensions parallel to the interface planes. Repeatability of the relative position an orientation of the two Hardware Modules 3 can thus be ensured by accurately machining these contact surfaces.

In the embodiment of FIG. 7a, the two positioning couplings each are realised by corresponding off-center positioning pins 312 and positioning holes 322.

In the embodiment of FIG. 7b, one of the positioning couplings is realised by an off-center positioning pin 312 and positioning hole 322, and the other one by a central positioning pin 312 and positioning hole 322. The latter can be hollow, leading to a tubular positioning pin 312. A centering ring can be arranged between the central positioning pin 312 and central positioning hole 322.

There exist different possible configurations for assigning pins and holes to the two interfaces. This is the case for locking as well as for positioning couplings.

For example, in FIG. 7a with four locking couplings, two diametrically opposed locking couplings have their locking pins 311 in one interface, and the other locking couplings two have their locking pins 311 in the other interface. This allows for two positions for mating the interfaces, rotated by 180° relative to one another in the interface plane.

For example, in FIG. 7a with two off-centre positioning couplings, if one has its first positioning pin 312 in one interface and the second positioning pin 312 in the other interface, then there is only one position in which the interfaces can be mated. If there are to be two positions, rotated by 180° relative to one another, then either both positioning pins 312 must be in the same interface, and both positioning holes 322 in the other, or there must be only one positioning pin 312 in total. In the latter case, there should be a central positioning pin and hole present, as in FIG. 7b, in order to completely define the relative position and orientation.

FIG. 8a-e schematically show the operation of a locking coupling 311, 321. The locking pin 311 comprises a locking recess 3110 with a first locking surface 3111, essentially normal to the first interface plane 310, and a second locking surface 3112, inclined relative to the first interface plane 310. As shown, these two locking surfaces can be separate sections of a cylindrical surface. The locking pin 311 is mounted on the first interface 31 by means of a resilient locking suspension 3113. This locking suspension allows the locking pin 311 to move, against a force of one or more locking spring elements, both in parallel to the first interface plane 310 and normal to the first interface plane 310. In the present example, the locking suspension 3113 is a stack of spring washers. In other embodiments, it can comprise elastomer springs.

Figure 8A:
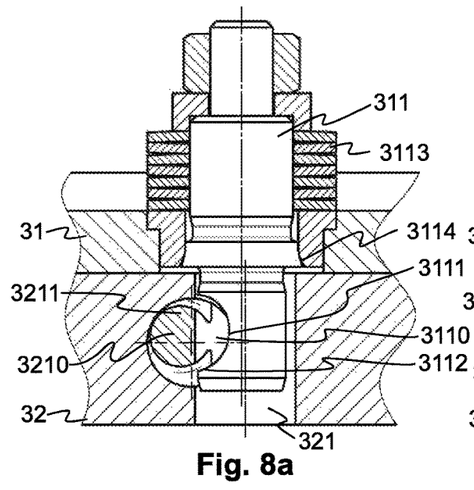
FIG. 8a-c locking couplings of an interface.
Figure 8B:
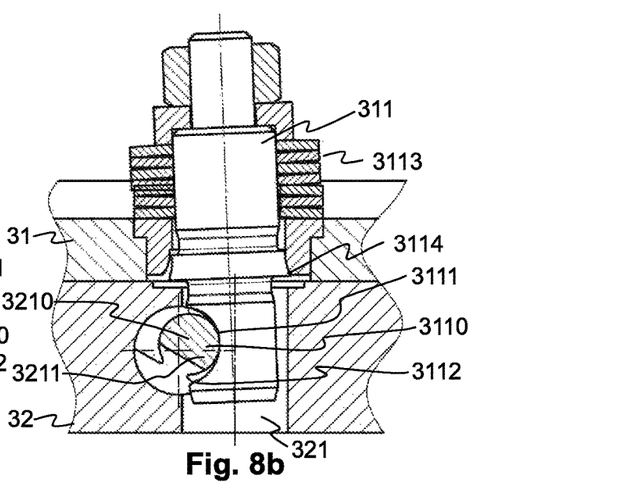
Figure 8C:
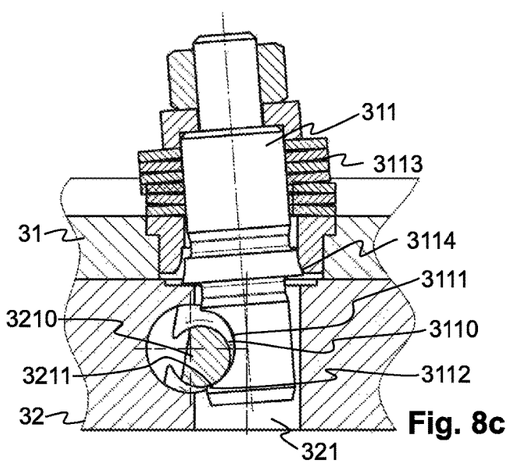

The cam element 3210 is arranged in the second interface 32 in a manner rotatable around an axis essentially parallel to the second interface plane 320. It comprises a cam nose 3211 that, when the cam element 3210 is rotated, interacts with a locking pin 311 that is present in the locking hole 321.

Prior to mating and coupling the interfaces, the cam element 3210 is held in a defined unlocked position by means of a snap-action mechanism. In this position, shown in FIG. 8a, a locking pin 311 can be inserted in the locking hole 321 without being hindered by the cam element 3210.

The interfaces are mated by aligning and mating the locking and positioning couplings and placing the first interface plane 310 and second interface plane 320 against one another. Thereby two relative rotations and one relative translation are defined. Coupling the interfaces is then accomplished by rotating, in each locking coupling, the respective cam element 3210, which causes the following to happen:

- a holding force of the snap-action mechanism is overcome.
- the cam nose 3211 contacts the first locking surface 3111 and pushes the locking pin 311 in a direction parallel to the first interface plane 310 and second interface plane 320, as shown in FIG. 8b. Movement stops when the contact surfaces of the positioning couplings 312, 322 touch. Thereby, the two remaining relative translations and one relative rotation in the interface planes is defined. The locking pin 311 can give way, in the direction parallel to the contact surfaces, thanks to the resilient suspension 3113, allowing for further rotation of the cam element 3210. An outer cylindrical surface of the cam element 3210 remains in contact with the first locking surface 3111, maintaining the force on the positioning couplings.
- The cam nose 3211 contacts the second locking surface 3112 and pulls the locking pin 311 in a direction normal to the interface planes 310, 320, as shown in FIG. 8c. This pulls the interface planes 310, 320 against one another. Again, the locking pin 311 can give way, now in the direction normal to the contact surfaces, thanks to the resilient suspension 3113, allowing for further rotation of the cam element 3210. An outer surface section of the locking pin 311 slides along an inner edge 3114 of the locking hole 321 in the direction normal to the contact surfaces. This inner edge 3114 defines, at one or more points where it contacts said outer surface, an axis parallel to the contact surfaces around which the locking pin 311 rotates while giving way. The outer cylindrical surface of the cam element 3210 comes into contact with the second locking surface 3112, maintaining the force that pulls interface planes 310, 320 against one another. The outer cylindrical surface of the cam element 3210 still exerts the force in the direction parallel to the first interface plane 310, maintaining the force on the positioning couplings.

The same or a different snap-action mechanism holds the cam element 3210 in the resulting locked position.

Figure 9A:
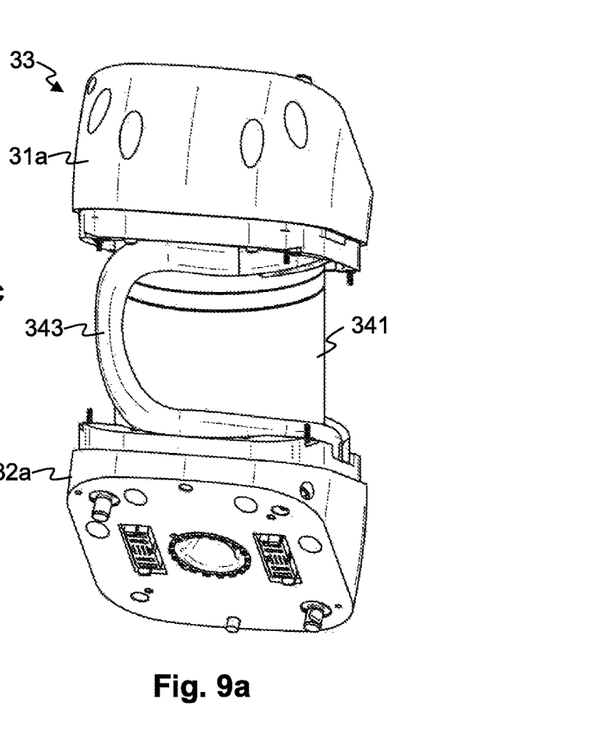
FIG. 9a-b a conduit guided through a Hardware Module.
In principle, identical parts are provided with the same reference symbols in the figures.
Figure 9B:
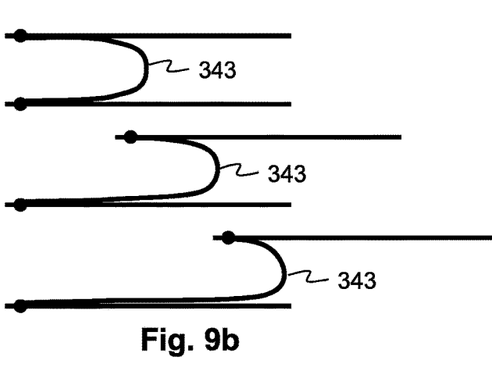

FIG. 9a schematically shows a conduit 343 guided through a manipulator module 33. The conduit 343 is attached at one end to the first link 31a and at the other to the second link 32a. The conduit 343 is guided within a cylindrical hollow space between an inner cylinder wall 341 and outer cylinder wall 342 (shown removed in FIG. 9a, see FIG. 4a). These cylinders are coaxial with the joint 34. When the joint 34 is rotated, the links 31a, 32a are rotated relative to one another and the conduit 343 flexes within the hollow space as the points at which it is attached to the links 31a, 32a move. FIG. 9b schematically shows a flat projection of the trajectory of the conduit 343 at different relative positions of the joint 34. These different positions are schematically shown by different relative horizontal positions of an upper and a lower line, representing the first and second link.

While the invention has been described in present embodiments, it is distinctly understood that the invention is not limited thereto, but may be otherwise variously embodied and practised within the scope of the claims.

The invention claimed is:

1. A Hardware Module for a robotic system, the Hardware Module comprising two mechanical links connected by a rotary joint and a flexible conduit, and a cylindrical conduit guiding space defined by a hollow space between an inner cylinder wall and an outer cylinder wall, the two cylinder walls extending from a first end to a second end of the hollow space and being coaxial with one another and with the axis of the rotary joint, the conduit being at a first end attached to the first link and guided from there into the hollow space at the first end of the hollow space, and the conduit being at a second end attached to the second link and guided from there into the hollow space at the second end of the hollow space, the length of the conduit between the first end and the second end allowing for a relative rotation of at least 180° or at least 270° or at least 360° between the first link and the second link, wherein a channel leads from the first link to the second link and runs in a region of the rotary joint coaxially to the axis of the rotary joint, wherein the channel comprises two tube sections sliding in one another with a fluid-tight connection.

2. The Hardware Module according to claim 1, wherein the inner cylinder wall surrounds further elements of the rotary joint.

* * * * *